United States Patent
Tsai et al.

(10) Patent No.: US 9,045,050 B2
(45) Date of Patent: *Jun. 2, 2015

(54) INDUCTIVE CHARGING METHOD FOR VEHICLES

(71) Applicant: Fu Da Tong Technology Co., Ltd., New Taipei (TW)

(72) Inventors: Ming-Chiu Tsai, New Taipei (TW); Chi-Che Chan, New Taipei (TW)

(73) Assignee: Fu Da Tong Technology Co., Ltd., Zhonghe Dist, New Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 14/458,266

(22) Filed: Aug. 13, 2014

(65) Prior Publication Data

US 2014/0347010 A1    Nov. 27, 2014

Related U.S. Application Data

(63) Continuation of application No. 13/276,131, filed on Oct. 18, 2011, now Pat. No. 8,860,365.

(30) Foreign Application Priority Data

Aug. 12, 2011    (TW) ............................. 100128812 A

(51) Int. Cl.
| | |
|---|---|
| H02J 7/00 | (2006.01) |
| B60L 11/18 | (2006.01) |
| H02J 5/00 | (2006.01) |
| H02J 7/02 | (2006.01) |

(52) U.S. Cl.
CPC ............... *B60L 11/182* (2013.01); *H02J 5/005* (2013.01); *H02J 7/025* (2013.01); *B60L 11/1846* (2013.01); *Y02T 10/7088* (2013.01); *Y02T 10/7005* (2013.01); *Y02T 90/163* (2013.01); *Y02T 90/169* (2013.01); *Y02T 90/14* (2013.01); *Y02T 90/128* (2013.01); *Y02T 90/122* (2013.01); *Y04S 30/14* (2013.01); *B60L 11/1812* (2013.01); *Y02T 90/121* (2013.01)

(58) Field of Classification Search
USPC ......................................................... 320/108
See application file for complete search history.

(56) References Cited

U.S. PATENT DOCUMENTS

| | | | |
|---|---|---|---|
| 4,496,896 A | 1/1985 | Melocik | |
| 5,594,318 A * | 1/1997 | Nor et al. ...................... | 320/108 |
| 6,100,663 A * | 8/2000 | Boys et al. .................... | 320/108 |
| 6,104,169 A | 8/2000 | Radys | |
| 7,602,142 B2 | 10/2009 | Weber | |
| 8,183,827 B2 | 5/2012 | Lyon | |
| 8,212,518 B2 | 7/2012 | Pijnenburg | |
| 8,217,535 B2 | 7/2012 | Uchida | |
| 2004/0145342 A1 | 7/2004 | Lyon | |
| 2005/0068019 A1 | 3/2005 | Nakamura | |
| 2008/0172176 A1 | 7/2008 | Hayek | |
| 2009/0091291 A1 | 4/2009 | Woody | |
| 2009/0153099 A1 | 6/2009 | Mahawili | |
| 2009/0284245 A1 | 11/2009 | Kirby | |
| 2009/0315512 A1 | 12/2009 | Ichikawa | |
| 2010/0133916 A1 * | 6/2010 | Sato .............................. | 307/104 |
| 2011/0291489 A1 | 12/2011 | Tsai | |

* cited by examiner

*Primary Examiner* — Samuel Berhanu

(74) *Attorney, Agent, or Firm* — Winston Hsu; Scott Margo

(57) ABSTRACT

An inductive charging system for vehicles includes a power receiving (PR) device disposed in a vehicle, and a power sourcing (PS) device disposed in a charging equipment separated from the vehicle.

7 Claims, 9 Drawing Sheets

INDUCTIVE CHARGING METHOD FOR VEHICLES

CROSS REFERENCE TO RELATED APPLICATIONS

This application is a continuation application of U.S. application Ser. No. 13/276,131, filed on Oct. 18, 2011, entitled "INDUCTIVE CHARGING METHOD FOR VEHICLES", and claiming the priority benefit of Taiwan patent application number 100128812 filed on Aug. 12, 2011.

BACKGROUND OF THE INVENTION

1. Field of the Invention

The present invention relates to an inductive charging method for vehicles, particularly to the method which utilizes a frequency converter power sourcing (PS) module in a PS device to connect with a signal control circuit and a power source and series connected power receiving (PR) modules in a PR device to connect with a bleeder circuit and a PR output terminal, allowing vehicles to be wirelessly charged and identified, make comparisons of voltages, adjust power and transmit data, thus achieving the effect of convenience in use and prevention of electricity leakage and theft.

2. Description of the Prior Art

Generally, most of electric vehicles are equipped with storage batteries inside. Such vehicles need to be charged when electricity in the storage batteries run out or is insufficient to use. Yet such charging method requires electric connections of vehicles with power lines and sockets. When charging stations are installed, it is very likely to cause leakages of electricity which may lead to electric shocks or problems of power consumption due to wet sockets with rainwater, in addition to possibilities that someone steals electricity from these sockets illegally. Therefore, as inductive charging technology has been developed and applied, and systems that transmit power inductively rely on DC power input to driving coils at the PS end to transmit electric energy to PR coils through AC electromagnetic waves, following procedures of rectification, filter and voltage stabilization, to provide DC power to electromechanical systems at the rear of the PR end, some firms try to apply the inductive charging technology in charging of electric vehicles.

However, electromechanical systems require high-voltage DC power to operate, and there is no way to raise the voltage at the PR output end with the inductive charging technology due to the following two reasons:

(1) the voltage outputted from the PR end originates from that of PR coils following procedures of rectification, filter and stabilization. As each of these procedures will result in voltage reduction following processing, if the output voltage is required to be raised at the PR end, the voltage of the PR coil at the initial end must be raised remarkably and rectifying components at the rear end are required to resist high voltage. Since high-voltage resistant components are very expensive and difficult to manufacture, this will cause much difficulty and too high costs in practice.

(2) if high voltage is needed on the PR coil, it indicates that it is necessary to provide high driving voltage on the PS coil to emit electric power. Under such circumstance, driving components at the PS end must be components capable of driving high voltage. Since the components of such kind are very expensive and difficult to manufacture, this will cause much difficulty and too high costs in practice.

Thus, how to overcome the problems and advantages of high cost and high difficulty in raising output voltage at the PR end with inductive charging technology of conventional use is what the firms engaged in this field need urgently to research and improve.

SUMMARY OF THE INVENTION

The primary object of the present invention is to enable the PS device to transmit electric power wirelessly through frequency converter PS modules and to enable series connected PR modules of the PR device to receive electric power, so as to increase the total voltage to charge vehicles. By using shunts and bleeder circuits, the PR microprocessor can receive the total output voltage that has been shunted for comparison without installing high-voltage resistant components. As it is unnecessary to make wired connections, there is no possibility for water to go into charging sockets. Besides, it can perform activities related to identification, stored value or deductions through data transmission, thus achieving the purposes of lower cost, convenience for use and preventability of electricity leakages and thefts.

A secondary purpose of the present invention is to enable PS microprocessors of first frequency converter PS sub-modules in the frequency converter PS module to perform power adjustment by frequency conversion via the coil voltage detection circuit, so as to ensure that the output power is the same as the preset power and to prevent situations of too low or high voltage from occurring. This can avoid the problems of causing the PR modules of the PR device unable to be charged or in danger following receipt of electric power, thus achieving the purposes of stable and safe charging.

Another object of the present invention is to enable PR microprocessors of the first PR sub-modules to make comparisons of voltages by using the bleeder circuit following receipt of electric power and series connection of the PR modules. If the shunted total voltage is not equal to the voltage of the preset multiples, the PR microprocessor of the first PR sub-module will transmit PS status error codes to the corresponding first frequency converter PS sub-module, which will further transmit these codes to a signal control circuit. The signal control circuit will send signals to other first frequency converter PS sub-module to suspend power supply and stop charging immediately at occurrence of unstable, too high or low voltage, thus achieving the purpose of protecting systems.

To achieve the purposes described above, an embodiment of the invention discloses an inductive charging system for vehicles, and includes a power receiving (PR) device disposed in a vehicle, and a power sourcing (PS) device disposed in a charging equipment separated from the vehicle.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
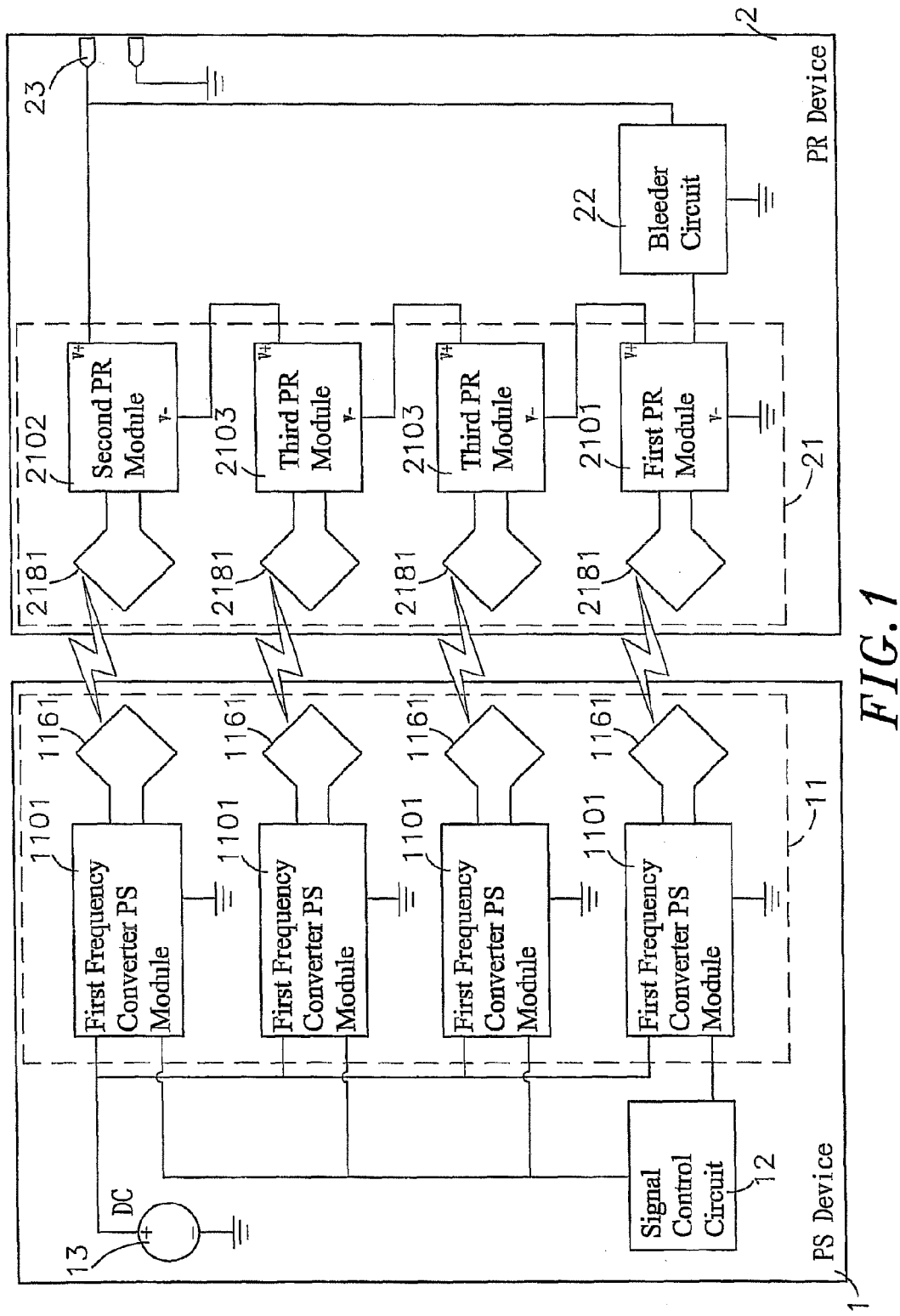
FIG. 1 is a block diagram of the circuit according to the present invention.
Figure 2:
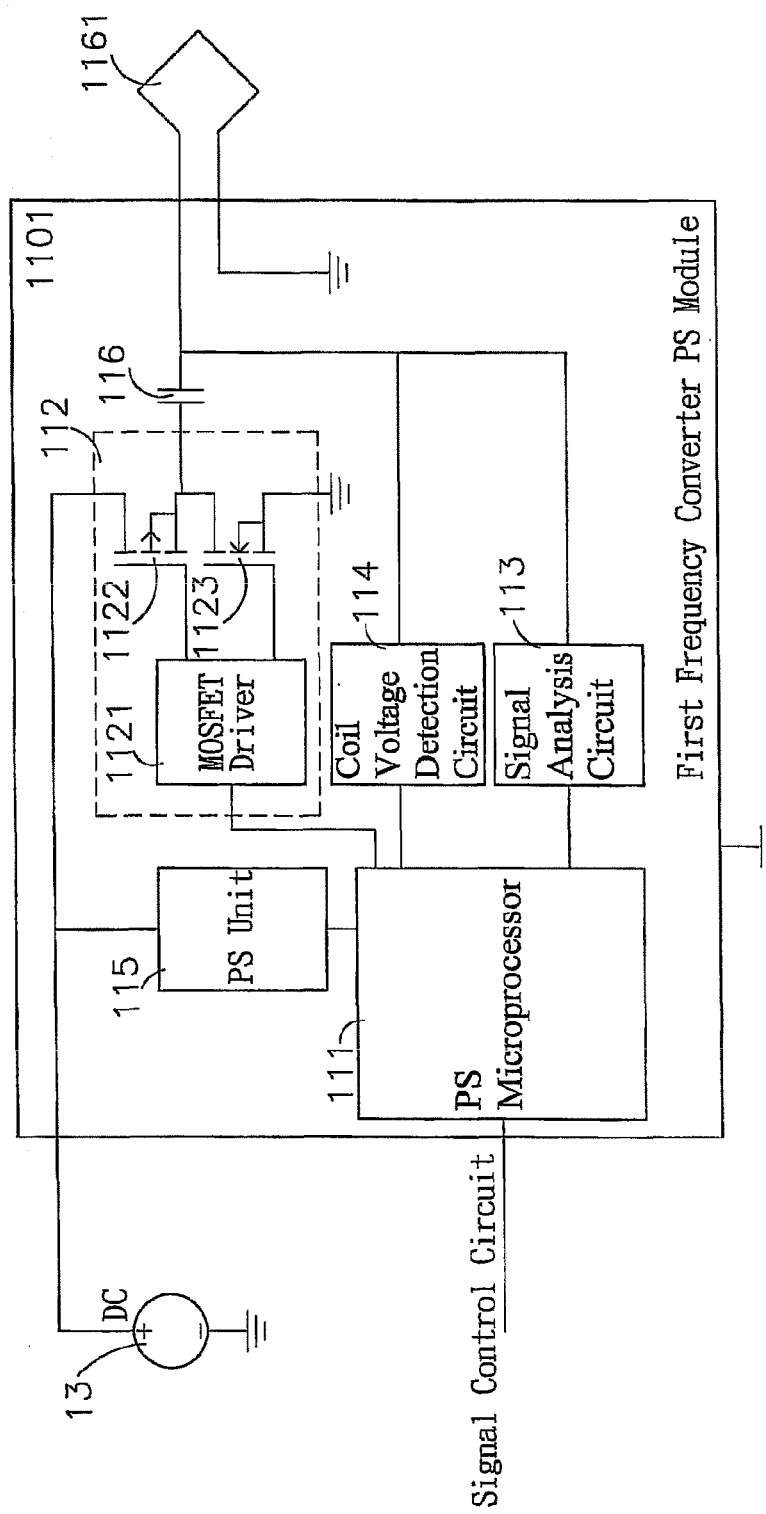
FIG. 2 is a block diagram of the circuit of the first frequency converter power sourcing module according to the present invention.
Figure 3:
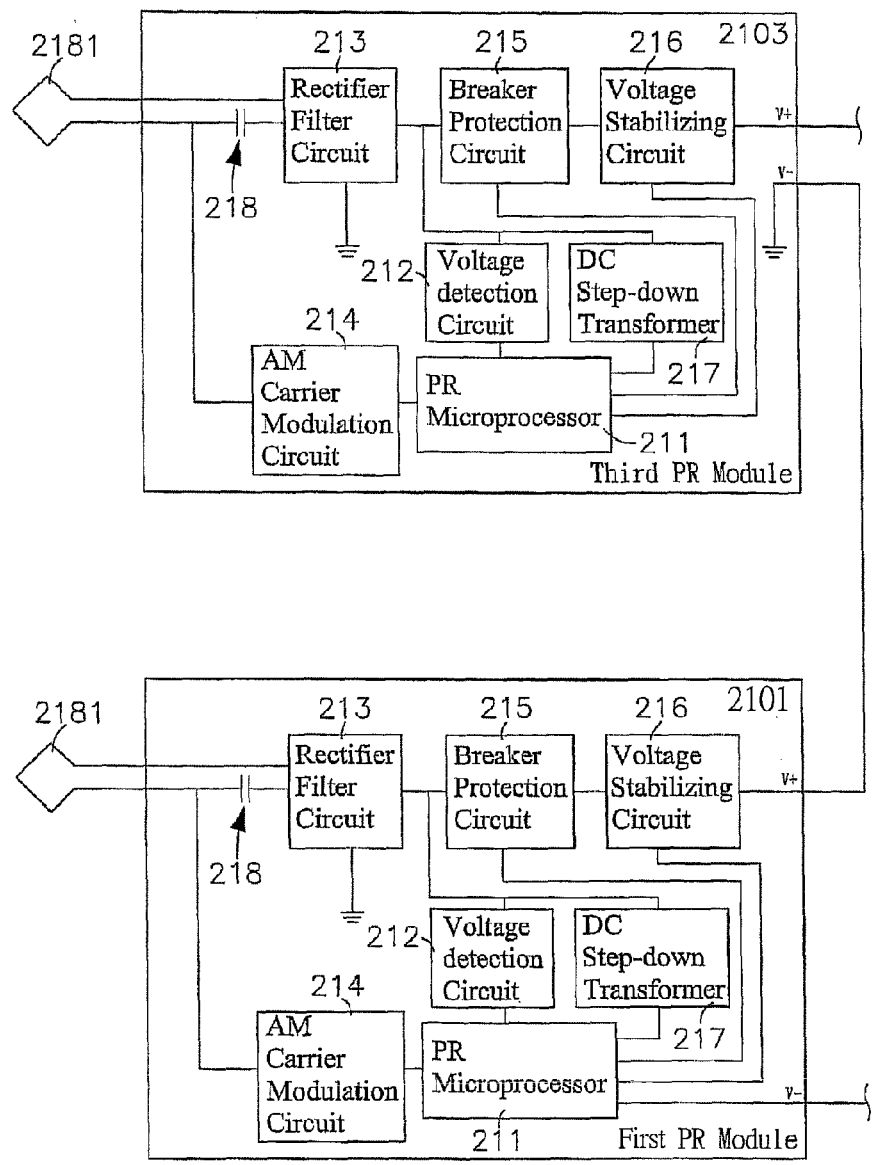
FIG. 3 is a block diagram of the circuit of the first and third power receiving modules according to the present invention.
Figure 4:
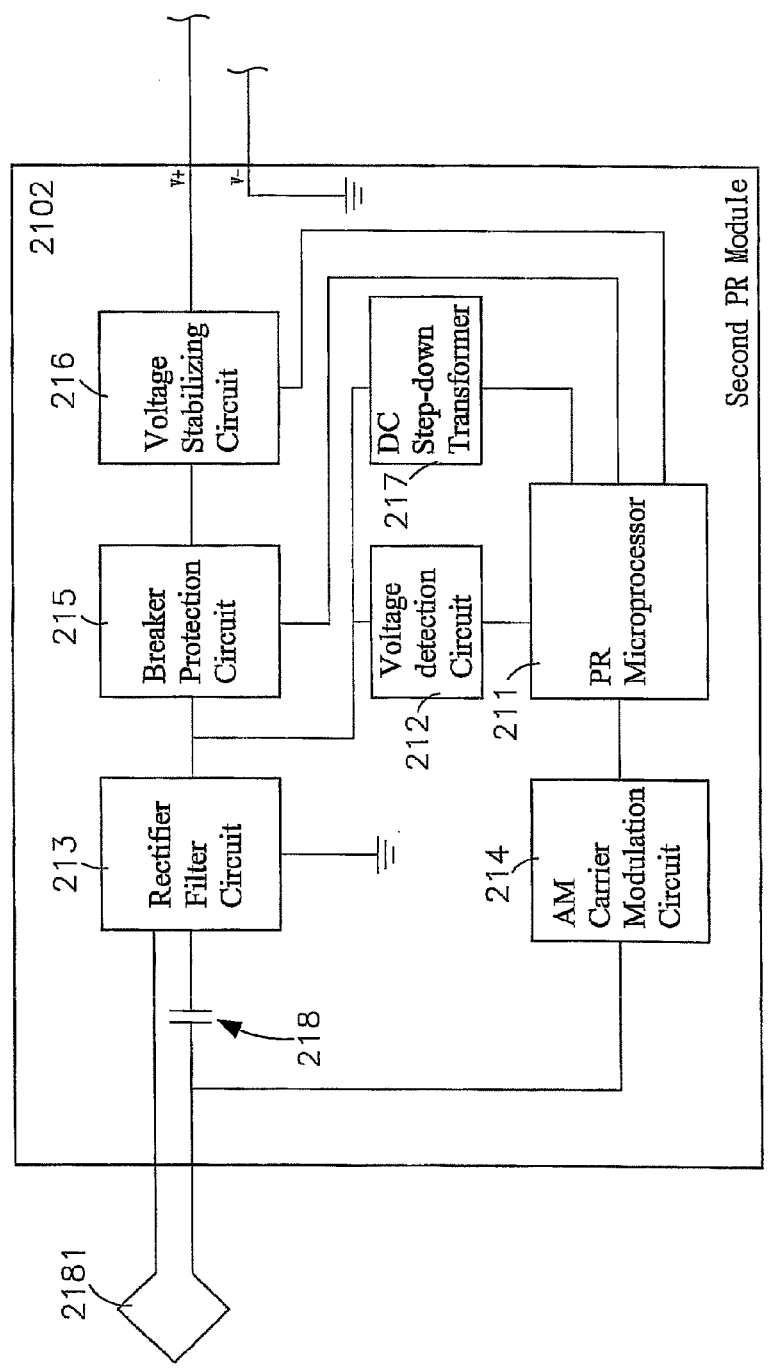
FIG. 4 is a block diagram of the circuit of the second power receiving module according to the present invention.
Figure 5:
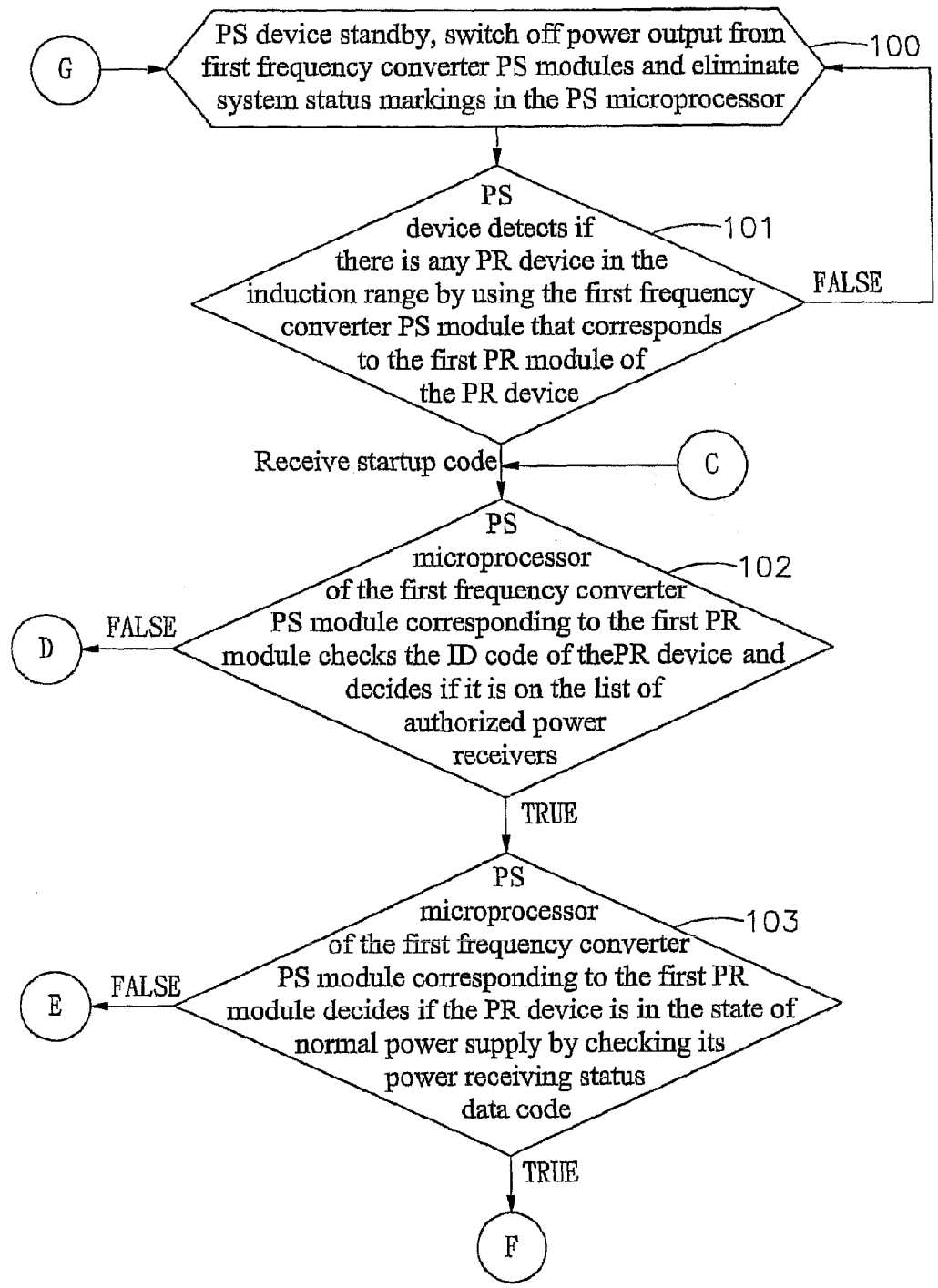
FIG. 5 is a flow chart illustrating operation of the power sourcing device according to the present invention (I).
Figure 6:
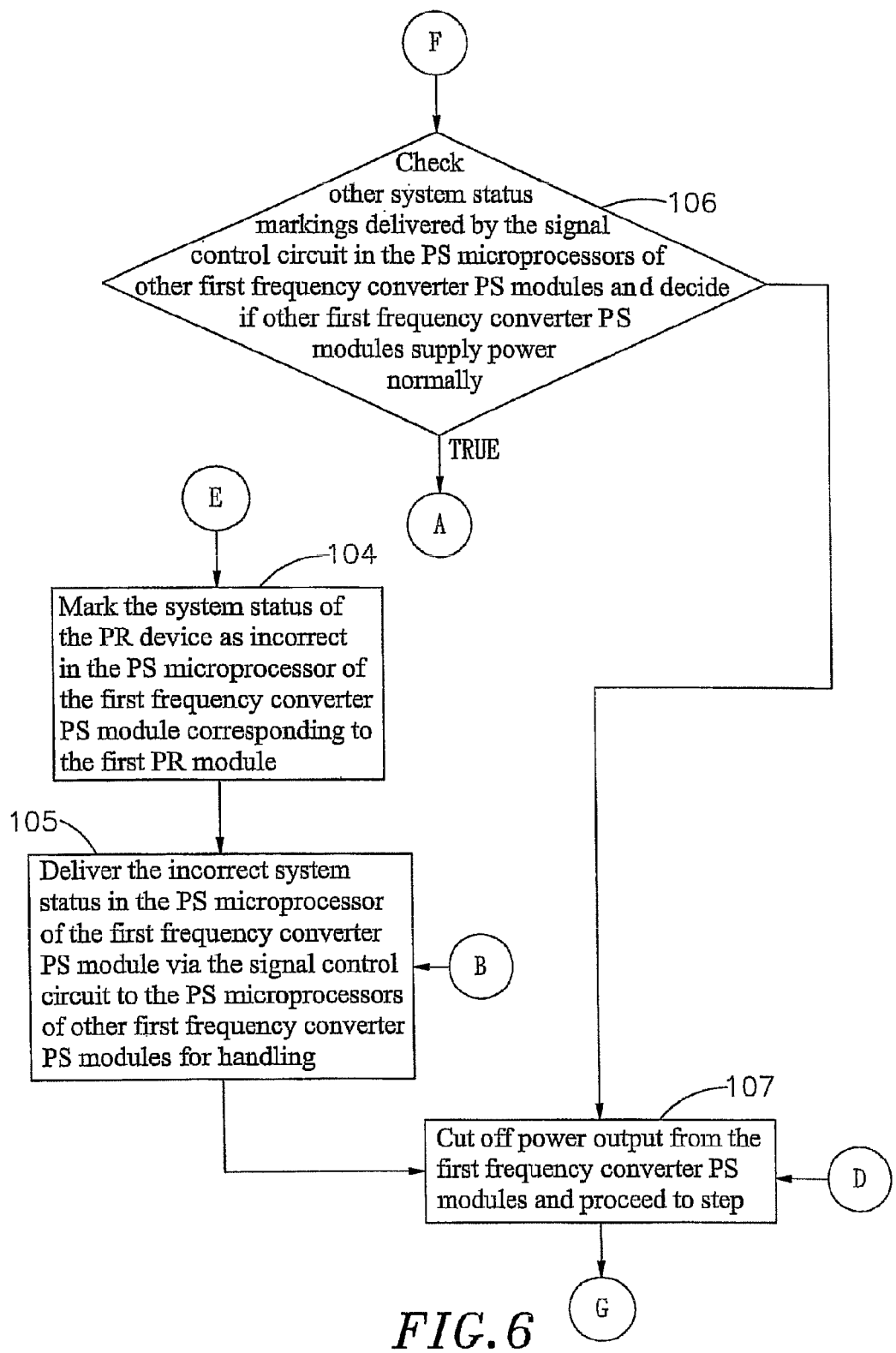
FIG. 6 is a flow chart illustrating operation of the power sourcing device according to the present invention (II).
Figure 7:
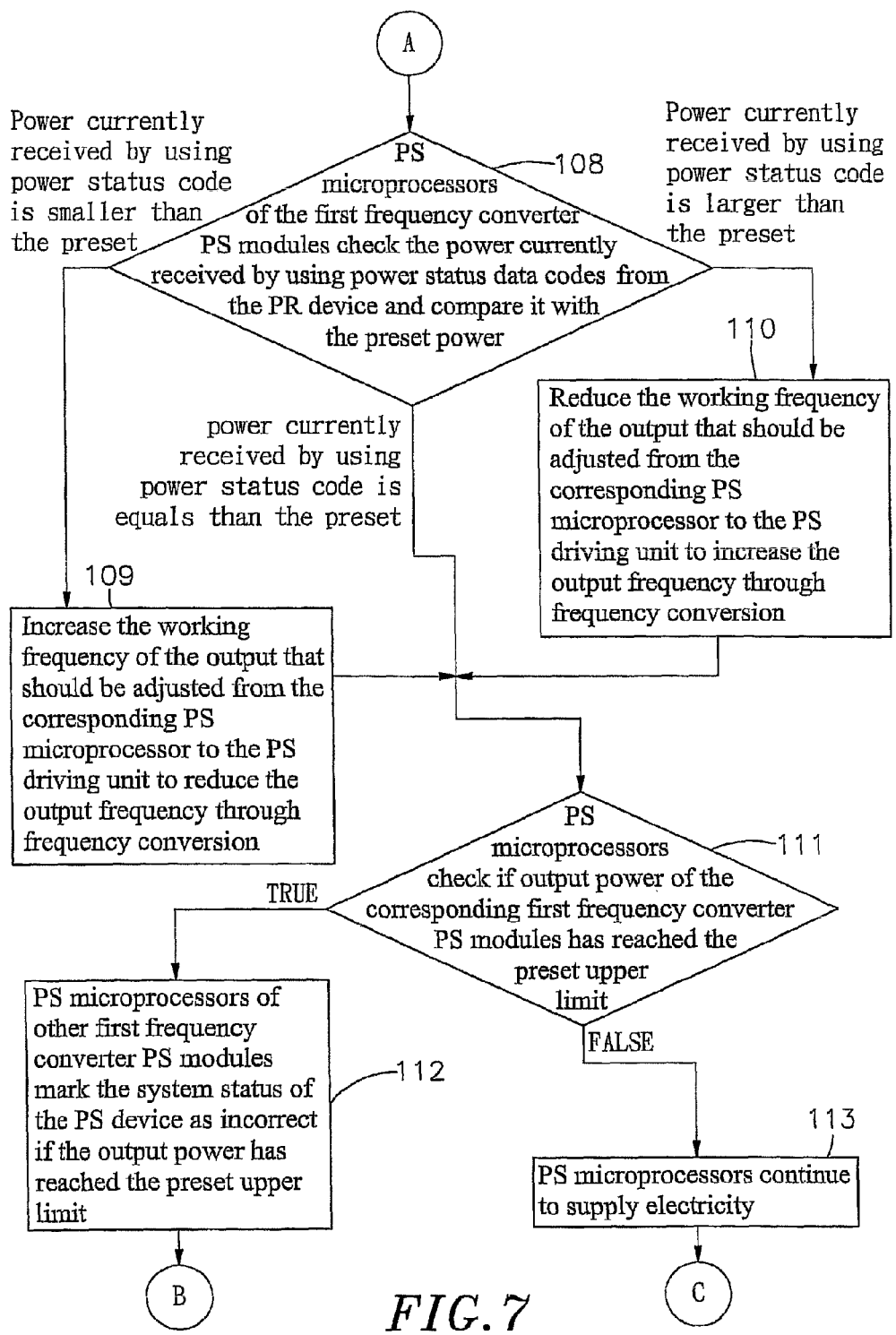
FIG. 7 is a flow chart illustrating operation of the power sourcing device according to the present invention (III).
Figure 8:
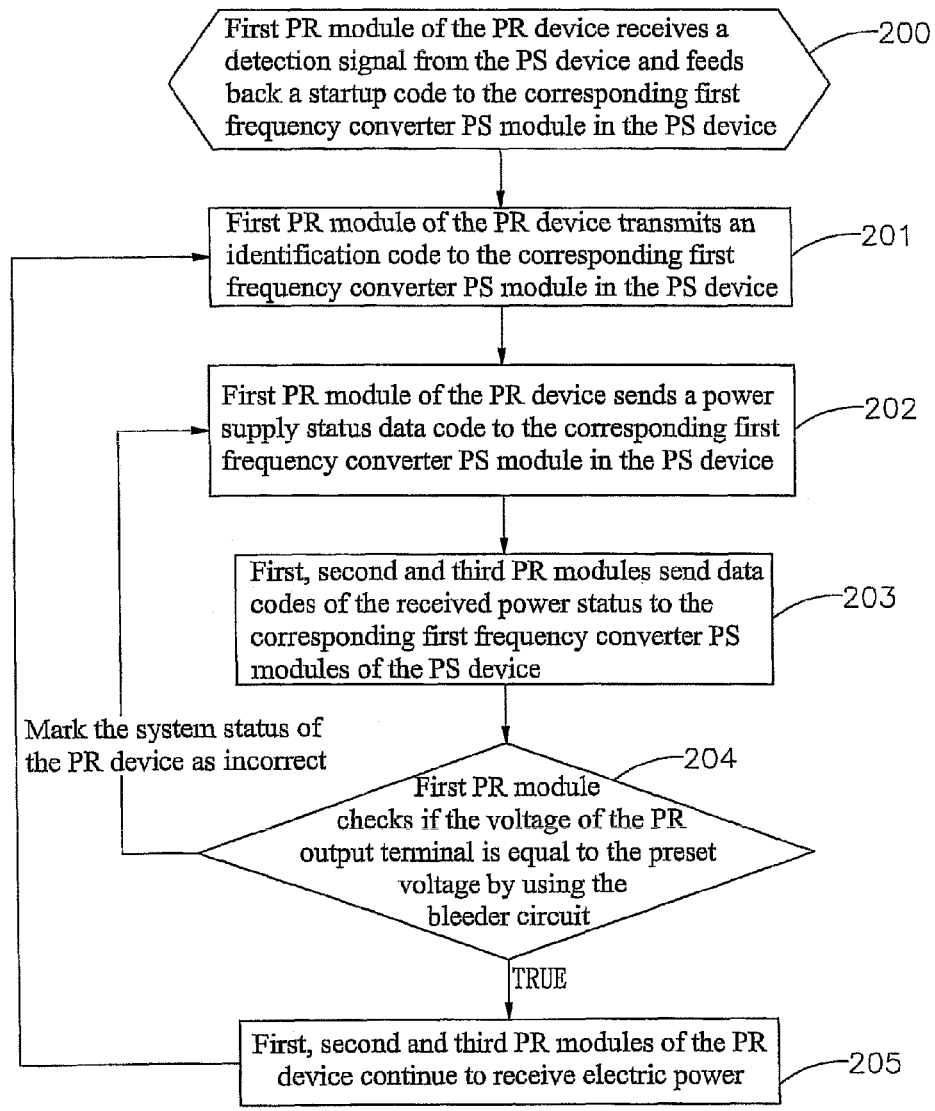
FIG. 8 is a flow chart illustrating operation of the power receiving device according to the present invention.

To achieve the aforesaid objects and functions as well as the techniques adopted in the present invention and its fabrication, examples of the preferred embodiments of the present invention are given below to illustrate features and functions of the present invention in detail by referring to the accompanying drawings.

Refer to FIGS. 1, 2, 3 and 4, which are block diagrams of the circuits of the first frequency converter PS sub-module, of the first and third PR sub-modules and of the second PR sub-module according to the present invention. As shown clearly in these figures, the inductive charging method for vehicles comprises a PS device 1 and a PR device 2, wherein:

The PS device 1 includes a frequency converter PS module 11, in which two or more first frequency converter PS sub-modules 1101 are installed in parallel, and each of the first frequency converter PS sub-modules 1101 includes a PS microprocessor 111 in which the operating program, control program, data code analysis software and other related programs are installed. The PS microprocessors 111 are electrically connected with a PS driving unit 112, a signal analysis circuit 113, a coil voltage detection circuit 114 and a PS unit 115 respectively, wherein the PS driving unit 112 is equipped with a MOSFET driver 1121, which is connected with the PS microprocessor 111, a high-side MOSFET component 1122 and a low-side MOSFET component 1123 respectively, so as to further connect to a resonance circuit 116, and the high-side MOSFET component 1122 is electrically linked the PS unit 115; the signal analysis circuit 113 and coil voltage detection circuit 114 is electrically connected to the resonance circuit 116, which is connected with a PS coil 1161 that may transmit power energy and data signals. Each of the first frequency converter PS sub-module 1101 is connected in series with the a signal control circuit 12 and a power source 13, while the signal control circuit 12 is electrically connected with the PS microprocessor 111 of the first frequency converter PS sub-module 1101, and the PS unit 115 and PS driving unit 112 of the first frequency converter PS sub-module 1101 are connected in parallel with the power source 13.

The PR device 2 contains a PR module 21 in which a first PR sub-module 2101 and a second PR sub-module 2102, together with one or more third PR sub-modules 2103 placed in series between them, are installed in series to match the first frequency converter PS sub-module 1101. The first PR sub-module 2101, second PR sub-module 2102 and third PR sub-modules 2103 are equipped with a PR microprocessor 211 respectively to install the operating program, control programs and other necessary software programs. The PR microprocessor 211 is connected with a voltage detection circuit 212, an AM carrier modulation circuit 214, a breaker protection circuit 215, a voltage-stabilizing circuit 216 and a DC step-down transformer 217 respectively, wherein the voltage detection circuit 212 and DC step-down transformer 217 is connected in parallel with a rectifying filter circuit 213, which, together with the breaker protection circuit 215 and voltage-stabilizing circuit 216, is connected in series with a resonance circuit 218 and a PR coil 2181. The PR microprocessor 211 and AM carrier modulation circuit 214 are connected in series with the resonance circuit 218, while the breaker protection circuit 215 is connected in series with a resistor, a P-type MOSFET component and an N-type MOSFET component, so as to electrically connect with the PR microprocessor 211 via the N-type MOSFET component and with the voltage stabilizing circuit 216 via the P-type MOSFET; the voltage detection circuit 212, breaker protection circuit 215 and DC step-down transformer 217 connect to the rectifying filter circuit 213 respectively, and the rectifying filter circuit 213 and AM carrier modulation circuit 214 are electrically connected with the resonance circuit 218. Thus, the resonance circuit 218 is electrically connected with the PR coil 2181, while the first PR sub-module 2101, second PR sub-module 2102 and third PR sub-modules 2103 are connected in series via the voltage stabilizing circuit 216, and the second PR sub-module 2102 is electrically connected to a PR output terminal 23 via the voltage stabilizing circuit 216. The voltage stabilizing circuit 216 is shunted by a bleeder circuit 22, and then connected electrically to the PR microprocessor 211 of the first PR sub-module 2101.

There may be a different number, such as two, three, four, seven or twenty, of the first frequency converter PS sub-modules 1101 installed in the frequency converter PS module 11 of the PS device 1. If that number is two, the first PR sub-module 2101 and second PR sub-module 2102 are required to be installed in the PR module 21 of the PR device 2; if that number is three or more, the first PR sub-module 2101, second PR sub-module 2102 and one or more third PR sub-modules 2103 will be installed in the PR module 21, and the number of the third PR sub-modules 2103 to be installed decreases progressively with the number of the installed first frequency converter PS sub-modules 1101. The following descriptions are given by taking installation of four first frequency converter PS sub-modules 1101 in the frequency converter PS module 11 as an example. They are only intended to illustrate correspondence of the frequency converter PS modules 11 to the PR module 21 for charging and data transmission, and shall not be construed as limiting the appended patent claims of the present invention. It is hereby stated that all modifications and equivalent structural changes made without departing from the spirit and art of the present invention shall be included in the patent claims of the present invention.

The PR microprocessor 211 of the PR module 21 is electrically connected with the AM carrier modulation circuit 214 and breaker protection circuit 215 to operate and control data signals, and is electrically linked with the voltage stabilizing circuit 216 to secure stable transmission of data signals through time sequence arrangements. Then, the data code analysis software installed in the PS microprocessor 111 of the frequency converter PS module 11 is used to ensure that data codes of data signals can also be transferred stably in the process of power transmission from an inductive type power source, so as to minimize power losses in that process and prevent quick changes in load currents of the PR module 21 from affecting data code analysis by the PS microprocessor 111. In addition, the circuit used for power conversion is installed separately from that for data transmission in the PR module 21, which helps increase the maximal transmission power from the power supply system.

Refer to FIGS. 1, 2, 3, 4, 5, 6, 7 and 8, which are the circuit block diagram of the present invention and circuit block diagrams of the first frequency converter PS sub-module as well as first, second and third PR sub-modules, and flow charts illustrating operation of the PS device (I), (II) and of the PR device according to the present invention. As shown clearly in these figures, operation of the PS device 1 includes the following steps:

(100) PS device 1 standby, switch off power output from first frequency converter PS sub-modules 1101 and eliminate system status markings in the PS microprocessor 111.

(101) PS device 1 detects if there is any PR device 2 in the induction range by using the first frequency converter PS sub-module 1101 that corresponds to the first PR sub-module 2101 of the PR device 2. Proceed to step (102) if a startup code is received from the PR device 2; otherwise, proceed to step (100).

(102) PS microprocessor 111 of the first frequency converter PS sub-module 1101 corresponding to the first PR sub-module 2101 checks the ID code of the PR device 2 and decides if it is on the list of authorized power receivers. If yes, proceed to step (103); otherwise, proceed to step (107).

(103) PS microprocessor 111 of the first frequency converter PS sub-module 1101 corresponding to the first PR sub-module 2101 decides if the PR device 2 is in the state of normal power supply by checking its power receiving status data code. If yes, proceed to step (106); otherwise, proceed to step (104).

(104) Mark the system status of the PR device 2 as incorrect in the PS microprocessor 111 of the first frequency converter PS sub-module 1101 corresponding to the first PR sub-module 2101.

(105) Deliver the incorrect system status in the PS microprocessor 111 of the first frequency converter PS sub-module 1101 via the signal control circuit 12 to the PS microprocessors 111 of other first frequency converter PS sub-modules 1101 for handling.

(106) Check other system status markings delivered by the signal control circuit 12 in the PS microprocessors 111 of other first frequency converter PS sub-modules 1101 and decide if other first frequency converter PS sub-modules 1101 supply power normally. If yes, proceed to step (108); otherwise, proceed to step (107).

(107) Cut off power output from the first frequency converter PS sub-modules 1101 and proceed to step (100).

(108) PS microprocessors 111 of the first frequency converter PS sub-modules 1101 check the power currently received by using power status data codes from the PR device 2 and compare it with the preset power; if the currently received power is larger than the preset power, proceed to step (109); if it is smaller than the preset power, proceed to step (110); if it equals the preset power, proceed step (111).

(109) Increase the working frequency of the output that should be adjusted from the corresponding PS microprocessor 111 to the PS driving unit 112 to reduce the output frequency through frequency conversion, and then proceed to step (111).

(110) Reduce the working frequency of the output that should be adjusted from the corresponding PS microprocessor 111 to the PS driving unit 112 to increase the output frequency through frequency conversion.

(111) PS microprocessors 111 check if output power of the corresponding first frequency converter PS sub-modules 1101 has reached the preset upper limit, if yes, proceed to step (112); otherwise, proceed to step (113).

(112) PS microprocessors 111 of other first frequency converter PS sub-modules 1101 mark the system status of the PS device 1 as incorrect if the output power has reached the preset upper limit, and then proceed to step (105).

(113) PS microprocessors 111 continue to supply electricity and proceed to step (102).

Additionally, operation of the PR device 2 comprises the following steps:

(200) First PR sub-module 2101 of the PR device 2 receives a detection signal from the PS device 1 and feeds back a startup code to the corresponding first frequency converter PS sub-module 1101 in the PS device 1.

(201) First PR sub-module 2101 of the PR device 2 transmits an identification code to the corresponding first frequency converter PS sub-module 1101 in the PS device 1.

(202) First PR sub-module 2101 of the PR device 2 sends a power supply status data code to the corresponding first frequency converter PS sub-module 1101 in the PS device 1.

(203) First PR sub-modules 2101, second PR sub-modules 2102 and third PR sub-modules 2103 send data codes of the received power status to the corresponding first frequency converter PS sub-modules 1101 of the PS device 1.

(204) First PR sub-module 2101 checks if the voltage of the PR output terminal 23 is equal to the preset voltage by using the bleeder circuit 22. If yes, proceed to step (205); otherwise, mark the incorrect status and proceed to step (202).

(205) First PR sub-module 2101, second PR sub-module 2102 and third PR sub-modules 2103 of the PR device 2 continue to receive electric power and proceed to step (201).

When the PR device 2 enters into the inductive range of the PS device 1, the first PR sub-module 2101 of the PR device 2 is only required to align with any of the nearby first frequency converter PS sub-modules 1101 for subsequent processing, as the PR device 2 can rotate its direction. The first PR sub-module 2101 of the PR device 2 receives a detection signal and feeds back a startup code, and then delivers an identification code. Since the identification code contains information on users and stored value, etc, the corresponding first frequency converter PS sub-module 1101 in the PS device 1 will compare and decide if the PR device 2 is on the list of authorized power receivers following receipt of the identification code. It will start the power supply after having identified the paid users, thus preventing electricity from being stolen by illegal persons.

As slight error of inductance occurs indifferent PS coils 1161 in the process of manufacturing, this may lead to different power output from the frequency converter PS modules 11 of the PS device 1 in standby mode. However, the output power can be adjusted to be equal to the preset value through the aforesaid method to avoid too low or high power output that may cause the PR device 2 unable to be charged or in danger.

The first frequency converter PS sub-modules 1101 of the PS device 1 are equipped with the PS coils 1161 respectively to produce preset energy output of the same power following adjustment of power output by the first frequency converter PS sub-modules 1101. When facing the PS coils 1161 properly, the PR coils 2181 of the PR device 2 can receive preset energy output of the same power, making the total voltage produced by series connection equal to the voltage of the preset multiples; if deflecting from the PS coils 1161, the PR coils 2181 in the second PR sub-modules 2102 and third PR sub-modules 2103 will receive energy output of the power that is lower than scheduled, making the total voltage produced by series connection lower than the voltage of preset multiples; under such circumstance, the voltage output from the stabilizing circuit 216 of the second PR sub-module 2102 to the PR output terminal 23 will be shunted and transferred to the bleeder circuit 22 for shunt handling. Then, the shunted total voltage will be outputted to the PR microprocessor 211 of the first PR sub-module 2101, which will compare the shunted total voltage with that of the preset multiples. If the voltages are the same, there will be no action; otherwise the PR microprocessor 211 will emit a PR status error code through the AM carrier modulation circuit 214 and PR coil 2181 to the corresponding first frequency converter PS sub-module 1101 in the PS device 1.

Following receipt of the error code by the PS coil 1161, the corresponding first frequency converter PS sub-module 1101 corresponding to the first PR sub-module 2101 of the PS device 1 analyzes the error code using the signal analysis circuit 113 and processes it in the PS microprocessor 111, and then transmits the error code to the signal control circuit 12, which will send a system status signal to other first PR sub-modules 2101 to mark the system status of the PR device 2 as incorrect and make the frequency converter PS modules 111 terminate power supply. In this way, charging will be suspended promptly under the conditions of unstable, higher or lower voltages, thus achieving the purpose of protecting the system.

Besides, after the first PR sub-modules 2101, second PR sub-modules 2102 and third PR sub-modules 2103 transmit status data codes of received electric power to the corresponding first frequency converter PS sub-modules 1101 in the PS module 1, the PS microprocessors 111 of the first frequency converter PS sub-modules 1101 will check the power currently received by the PR terminal respectively and compare it with the preset power. If the currently received power is higher than the preset power, the PS microprocessor 111 will increase the working frequency of the corresponding PS driving unit 112 that needs to be adjusted to lower the output power through frequency conversion; if the currently received power is lower than the preset power, the PS microprocessor 111 will reduce the working frequency of the corresponding PS driving unit 112 that needs to be adjusted to increase the output power through frequency conversion; if the currently received power equals the preset power, no adjustment is made to ensure that the power received by the PR device 2 is equal to the preset power; furthermore, it can check if output power has reached or exceeded the preset upper limit for the PS device 1; it will continue to supply electric power if the preset upper limit is not reached; if the preset upper limit is reached for the PS device 1, the first frequency converter PS sub-modules 1101 whose output power has reached the preset upper limit will mark the system status of the PS device 1 as incorrect and transfer the status through the signal control circuit 12 to the microprocessors 111 of other first frequency converter PS sub-modules 1101 for processing to make the PS device 1 stop power supply.

The PS coils 1161 of the PS device 1 and PR coils 2181 of the PR device 2 as described above may be arranged like a rectangle, triangle, straight line or cross or any other shape, as long as these coils of two kinds can face each other properly to carry out mutual induction and transmission between them, and shall not be construed as limiting the appended patent claims of the present invention. It is hereby stated that all modifications and equivalent structural changes made without departing from the spirit and art of the present invention shall be included in the patent claims of the present invention.

Figure 9:
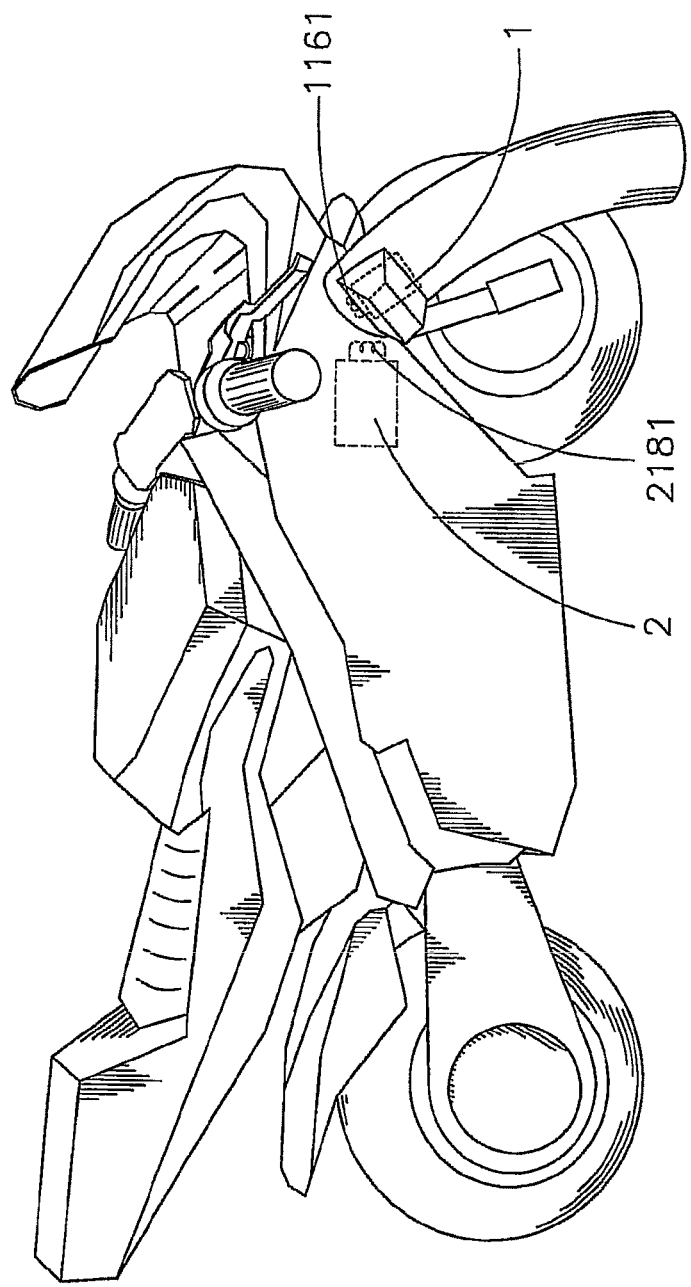
FIG. 9 is a three-dimensional appearance drawing according to one preferred embodiment of the present invention.

Refer to FIG. 9, which is a three-dimensional appearance drawing in accordance with one preferred embodiment of the present invention. As shown clearly in this figure, the PR device 2 can be installed on a steering handgrip of a motorcycle, so that the steering handgrip is close to the cylindrical object when the motorcycle stops, allowing the PS device 1 to charge the PR device 2.

The inductive charging method for vehicles as disclosed in the present invention has the advantages as follows when applied practically:

(1) the PS device 1 relies on the frequency converter PS modules 11 to transfer electric power wirelessly, received by the PR module 21 of the PR device 2, and the first and second PR sub-modules 2101 and 2102, or the first and second PR sub-modules 2101 and 2102 as well as one or more third PR sub-modules 2103 are connected in series to increase the total voltage for charging vehicles. Since it is not necessary to install charging sockets, it is impossible for water to enter into the sockets and cause leakage of electricity. Besides, it is not necessary to make wired connections for this method and identification can be conducted through data transmission before charging is started. In addition, this method helps implement operations concerning stored value and deductions.

(2) the PS microprocessors 111 of the first frequency converter PS sub-modules 1101 in the frequency converter PS modules 11 can make frequency converter power adjustments based on power status data codes from the PR device 2 to ensure that the power output is adjusted to be equal to the preset power value, thus avoiding situations of too low or high voltages and preventing charging problems or dangers.

(3) after receipt of electric power and series connection with other components, the PR module 21 of the PR device 2 depends on the PR microprocessor 211 of the first PR sub-module 2101 to make comparisons by using the bleeder circuit 22. If the shunted total voltage is not equal to the voltage of preset multiples, the first PR sub-module 2101 will send a PR status error data code via the corresponding first frequency converter PS sub-module 1101 to the signal control circuit 12, which sends a signal to other first frequency converter PS sub-modules 1101 to request suspension of power supply, thus interrupting charging immediately in occurrence of unstable, too high or low voltage.

(4) it utilizes series connection with the PR module 21 to increase the total voltage for charging vehicles and adopts shunting and the bleeder circuit 22, allowing the PR microprocessor 211 of the first PR sub-module 2101 to receive the shunted total output voltage and make comparisons without the need to use components of high-voltage specifications.

Therefore, the present invention chiefly involves the inductive charging method for vehicles, in which the first frequency converter PS sub-modules 1101 in the frequency converter PS module 11 of the PS device 1 are connected in parallel with the signal control circuit 12 and power source 13, while the first and second PR sub-modules 2101 and 2102, or the first PR sub-module 2101, second PR sub-module 2102 and one or more third PR sub-modules 2103 are connected in series inside the PR devices 2, and the second PR sub-module 2102 is electrically connected via the voltage stabilizing circuit 216 with the PR output terminal 23. The voltage stabilizing circuit 216 is connected in series with the bleeder circuit 22 for shunting and further connected with the PR microprocessor 211 of the first PR sub-module 2101, so as to charge vehicles wirelessly while preventing water from going into sockets to cause leakage of electricity or preventing illegal persons from stealing electricity from charging sockets. This method does not require wired connections and can carry out user identification through data transmission before charging or activities related to stored value and deductions are implemented, thus making it convenient to use in addition to functions of preventing electricity leakage or thefts. However, the above descriptions are given to illustrate preferred embodiments of the present invention and shall not be construed as limiting the appended patent claims of the present invention. It is hereby stated that all modifications and equivalent structural changes made without departing from the spirit and art of the present invention shall be included in the patent claims of the present invention.

In summary, the inductive charging method for vehicles as disclosed in the present invention can achieve its functions and objects when applied practically. Therefore, the present invention is really an excellent one with practical applicability and can satisfy the terms and conditions for patentability of a utility model. While the application of patent is filed pursuant to applicable laws, your early approval will be highly appreciated so as to guarantee benefits and rights of the inventor who has worked hard at this invention. For any question, please do not hesitate to inform the inventor by mail, and the inventor will try his best to cooperate with you.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An inductive charging system for vehicles, comprising:
  a power receiving (PR) device, disposed in a vehicle and comprising:
    a signal control circuit; and
    a plurality of first frequency converter power sourcing (PS) sub-modules, wherein each of the plurality of first frequency converter PS sub-modules comprises a PS microprocessor coupled to the signal control circuit; and
  a PS device, disposed in a charging equipment separated from the vehicle and comprising a first PR sub-module;
  wherein the inductive charging system for vehicles performs an inductive charging method, and the inductive charging method comprises:
    (A01) the PS device standby, switch off power output from the first frequency converter PS sub-modules and eliminate system status markings in the PS microprocessor;
    (A02) the PS device detects if there is any PR device in an induction range by using the first frequency converter PS sub-module that corresponds to the first PR sub-module of the PR device; proceed to step (A03) if a startup code is received from the PR device; otherwise, proceed to step (A01);
    (A03) the PS microprocessor of the first frequency converter PS sub-module corresponding to the first PR sub-module checks an ID code of the PR device and decides if it is on a list of authorized power receivers; if yes, proceed to step (A04); otherwise, proceed to step (A08);
    (A04) the PS microprocessor of the first frequency converter PS sub-module corresponding to the first PR sub-module decides if the PR device is in a state of normal power supply by checking its power receiving status data code; if yes, proceed to step (A07); otherwise, proceed to step (A05);
    (A05) mark system status of the PR device as incorrect in the PS microprocessor of the first frequency converter PS sub-module corresponding to the first PR sub-module;
    (A06) deliver the incorrect system status in the PS microprocessor of the first frequency converter PS sub-module via the signal control circuit to the PS microprocessors of other first frequency converter PS sub-modules for handling;
    (A07) check other system status markings delivered by the signal control circuit in the PS microprocessors of other first frequency converter PS sub-modules and decide if other first frequency converter PS sub-modules supply power normally; if yes, proceed to step (A09); otherwise, proceed to step (A08);
    (A08) cut off power output from the first frequency converter PS sub-modules and proceed to step (A01);
    (A09) the PS microprocessors of the first frequency converter PS sub-modules check the power currently received by using power status data codes from the PR device and compare it with a preset power; if the currently received power is larger than the preset power, proceed to step (A10); if the currently received power is smaller than the preset power, proceed to step (A11); if it equals the preset power, proceed step (A12);
    (A10) increase working frequency of output that should be adjusted from the corresponding PS microprocessor to the PS driving unit to reduce output frequency through frequency conversion, and then proceed to step (A12);
    (A11) reduce the working frequency of the output that should be adjusted from the corresponding PS microprocessor to the PS driving unit to increase the output frequency through frequency conversion;
    (A12) the PS microprocessors check if output power of the corresponding first frequency converter PS sub-modules has reached a preset upper limit; if yes, proceed to step (A13); otherwise, proceed to step (A14);
    (A13) the PS microprocessors of other first frequency converter PS sub-modules mark the system status of the PS device as incorrect if the output power has reached the preset upper limit, and then proceed to step (A06);
    (A14) the PS microprocessors continue to supply electricity and proceed to step (A03).

2. The inductive charging system for vehicles of claim 1, wherein the PS device further comprises:
  a plurality of PS coils, configured to output electric power and data signals, wherein each of the plurality of PS coils is respectively coupled to one of the plurality of first frequency converter PS sub-modules; and
  a power source, coupled to the plurality of first frequency converter PS sub-modules;
  wherein the plurality of first frequency converter PS sub-modules are connected in parallel, the signal control circuit is configured to control over power supply, and the signal control circuit is coupled to the plurality of first frequency converter PS sub-modules.

3. The inductive charging system for vehicles of claim 2, wherein each of the plurality of first frequency converter PS sub-modules further comprises:
  a PS driving unit, coupled to the power source;
  a signal analysis circuit, configured to detect and analyze coil data signals, wherein the signal analysis circuit is coupled between the corresponding PS coil of the plurality of PS coils and the PS microprocessor;

a coil voltage detection circuit, configured to detect voltage of the corresponding PS coil, wherein the coil voltage detection circuit is coupled between the corresponding PS coil and the PS microprocessor;

a PS unit, configured to supply electric power, wherein the PS unit is coupled between the power source and the PS microprocessor; and a resonance circuit, couple between the corresponding PS coil and the PS driving unit.

4. The inductive charging system for vehicles of claim 1, wherein the PR device further comprises:

a second PR sub-module;

at least one third PR sub-module, coupled between the first PR sub-module and the second PR sub-module;

a plurality of PR coils, configured for inductive signal transmission, wherein each of the plurality of PR coils is respectively coupled to the first PR sub-module, the second PR sub-module, or one of the at least one third PR sub-module;

a bleeder circuit, coupled to the first PR sub-module; and a PR output terminal, coupled between the second PR sub-module and the bleeder circuit.

5. The inductive charging system for vehicles of claim 4, wherein the first PR sub-module comprises:

a PR microprocessor, coupled to the bleeder circuit;

a voltage detection circuit, configured to detect voltage, wherein the voltage detection circuit is coupled to the PR microprocessor;

a rectifier filter circuit, configured to filter and rectify power signals, wherein the rectifier filter circuit is coupled between the corresponding PR coil of the plurality of PR coils and the voltage detection circuit;

an AM carrier modulation circuit, configured to code data signals, wherein the AM carrier modulation circuit is coupled between the corresponding PR coil and the PR microprocessor;

a breaker protection circuit, configured for control over switching in operation, wherein the breaker protection circuit is coupled between the rectifier filter circuit and the PR microprocessor;

a voltage stabilizing circuit, configured to stabilize voltage, wherein the voltage stabilizing circuit is coupled between the breaker protection circuit and the PR microprocessor;

a DC step-down transformer, coupled between the rectifier filter circuit and the PR microprocessor; and a resonance circuit, coupled between the rectifier filter circuit and the corresponding PR coil.

6. The inductive charging system for vehicles of claim 4, wherein the second PR sub-module comprises:

a PR microprocessor;

a voltage detection circuit, configured to detect voltage, wherein the voltage detection circuit is coupled to the PR microprocessor;

a rectifier filter circuit, configured to filter and rectify power signals, wherein the rectifier filter circuit is coupled between the corresponding PR coil of the plurality of PR coils and the voltage detection circuit;

an AM carrier modulation circuit, configured to code data signals, wherein the AM carrier modulation circuit is coupled between the corresponding PR coil and the PR microprocessor;

a breaker protection circuit, configured for control over switching in operation, wherein the breaker protection circuit is coupled between the rectifier filter circuit and the PR microprocessor;

a voltage stabilizing circuit, configured to stabilize voltage, wherein the voltage stabilizing circuit is coupled between the PR output terminal, the breaker protection circuit and the PR microprocessor;

a DC step-down transformer, coupled between the rectifier filter circuit and the PR microprocessor; and a resonance circuit, coupled between the rectifier filter circuit and the corresponding PR coil.

7. The inductive charging system for vehicles of claim 4, wherein each of the at least one third PR sub-module comprises:

a PR microprocessor;

a voltage detection circuit, configured to detect voltage, wherein the voltage detection circuit is coupled to the PR microprocessor;

a rectifier filter circuit, configured to filter and rectify power signals, wherein the rectifier filter circuit is coupled between the corresponding PR coil of the plurality of PR coils and the voltage detection circuit;

an AM carrier modulation circuit, configured to code data signals, wherein the AM carrier modulation circuit is coupled between the corresponding PR coil and the PR microprocessor;

a breaker protection circuit, configured for control over switching in operation, wherein the breaker protection circuit is coupled between the rectifier filter circuit and the PR microprocessor;

a voltage stabilizing circuit, configured to stabilize voltage, wherein the voltage stabilizing circuit is coupled between the breaker protection circuit and the PR microprocessor;

a DC step-down transformer, coupled between the rectifier filter circuit and the PR microprocessor; and a resonance circuit, coupled between the rectifier filter circuit and the corresponding PR coil.

* * * * *